United States Patent [19]
Yata

[11] 3,733,984
[45] May 22, 1973

[54] EXPOSURE CONTROL SYSTEMS FOR SINGLE REFLEX CAMERAS HAVING A DETACHABLE HOUSING

[75] Inventor: Kotaro Yata, Ikeda, Japan
[73] Assignee: Minolta Camera Kabushiki Kaisha, Osaka-shi, Osaka-fu, Japan
[22] Filed: July 3, 1972
[21] Appl. No.: 268,375

[52] U.S. Cl. ................................95/10 CT, 95/42
[51] Int. Cl. .......................G03b 7/08, G03b 19/12
[58] Field of Search ............95/10 C, 10 CT, 10 PD, 95/42

[56] References Cited
UNITED STATES PATENTS

| | | | |
|---|---|---|---|
| 3,630,133 | 12/1971 | Shimomura | 95/42 |
| 3,635,136 | 1/1972 | Hori et al. | 95/42 X |
| 3,643,560 | 2/1972 | Bonk | 95/42 X |

Primary Examiner—Samuel S. Matthews
Assistant Examiner—Michael L. Gellner
Attorney—Watson, Cole, Grindle & Watson

[57] ABSTRACT

In a single lens reflex camera, an exposure control system for a photographic camera is so constructed that a housing having a pentagonal prism therein is attachable to and detachable from the camera body. A detecting circuit for detecting the brightness of an object through the objective lens in an exposure control circuit and a memory circuit are built-in to the housing and a portion of the circuitry thereof is made as an integrated circuit. In the camera body a portion of the switching circuit for controlling the exposure of an electric shutter using the output of the detecting circuit as one input is built-in as an integrated circuit. The mounting of the pentagonal prism housing onto the camera body causes the terminals of the detecting and memory circuit and the terminals of the switching circuit to connect with one another.

5 Claims, 9 Drawing Figures

EXPOSURE CONTROL SYSTEMS FOR SINGLE REFLEX CAMERAS HAVING A DETACHABLE HOUSING

BACKGROUND OF THE INVENTION:

The present invention relates to an exposure control system in a single lens reflex camera and, more particularly, relates to an exposure control system in a single lens reflex camera which receives the incident scene light passing through the objective lens to detect the brightness of an object and electrically controls the shutter speed.

In a photographic camera, it is well known to detect the brightness of an object and control the exposure by operating a switching circuit by means of the light detected output. It is also well known to measure the scene light passing through the objective lens by a light receiving element to determine the brightness by the signal output thereof of an object and to store the signal output in a capacitor. The exposure is controlled by inputting the stored voltage into the switching circuit simultaneously with the starting of the exposure. And, according to such a system, in order to enlarge the controllable range of the brightness of an object, because the signal output stored in the capacitor is logarithmically compressed, a circuit is required to provide a logarithmic expansion to the voltage of the memory capacitor for controlling the exposure. Additional compensating circuits are required for respectively compensating the voltage fluctuation of the power source in the detecting circuit, the switching circuit, and associated circuits thereof, which results in a huge circuit. Therefore, when the related structures in these circuits are arranged in one integrated circuit, the terminals of the integrated circuit package are numerous. When such an integrated circuit is built into a camera, the capacity of the camera must be increased and accordingly a large space is necessary for connecting those terminals to the terminals of the non-integrated circuitry and it is difficult to wire and assemble. This fact is a disadvantage in making the circuit system an integrated circuit.

THE OBJECT OF THE INVENTION

One object of the present invention is to provide an exposure control system in which that circuitry capable of being integrated is constructed as integrated circuits for detecting received light passing through an objective lens and controlling the exposure time of a single lens reflex camera in accordance with the detected output.

Another object of the present invention is to provide an improved camera of the type specified with integrated electric circuits incorporated in the camera while maintaining normal camera size, and which camera is easy to assemble and handle and is also economical.

A further object of the present invention is to provide an exposure control system, wherein a pentagonal prism, a light receiving element for receiving the scene light passing through the objective lens, and an integrated circuit for detecting and storing the current generated by the light receiving element are built-in a detachable housing; and that circuitry capable of being integrated is made as an integrated circuit; and in the camera body, a switching circuit operated by a stored signal and manually set input circuit for manually setting the exposure time of the switching circuit are built-in and other integratable circuitry is constructed as an integrated circuit.

Yet another object of the present invention is to provide an exposure control system in which the exposure of the curtain shutter is controlled by a detecting circuit and a memory circuit constructed as an integrated circuit, and a switching circuit is also constructed as a separate integrated circuit.

SUMMARY OF THE INVENTION

In order to attain the above-mentioned objects, the present invention relates to an exposure control system for a photographic camera of the single lens reflex type wherein a housing, having a pentagonal prism, is attachable to and detachable from the camera body, and in the housing a light receptive element is mounted for receiving the scene light incident through the objective lens in the camera body. A detecting circuit for detecting the current generated by the light receptive element, a memory circuit for storing the detected current output, a generating circuit for generating current corresponding to the stored voltage of the memory circuit are built-in the housing. All circuit capable of being integrated are constructed as an integrated circuit. In the camera body a manual exposure time setting circuit and a switching circuit operated by the output of the manual exposure setting circuit and/or the generating circuit for generating current corresponding to the stored voltage of the memory circuit are built-in. Those circuits in the camera body that are capable of being integrated are also constructed as an integrated circuit. The switching circuit controls the exposure of the camera.

DETAILED DESCRIPTION OF THE INVENTION

Figure 1:
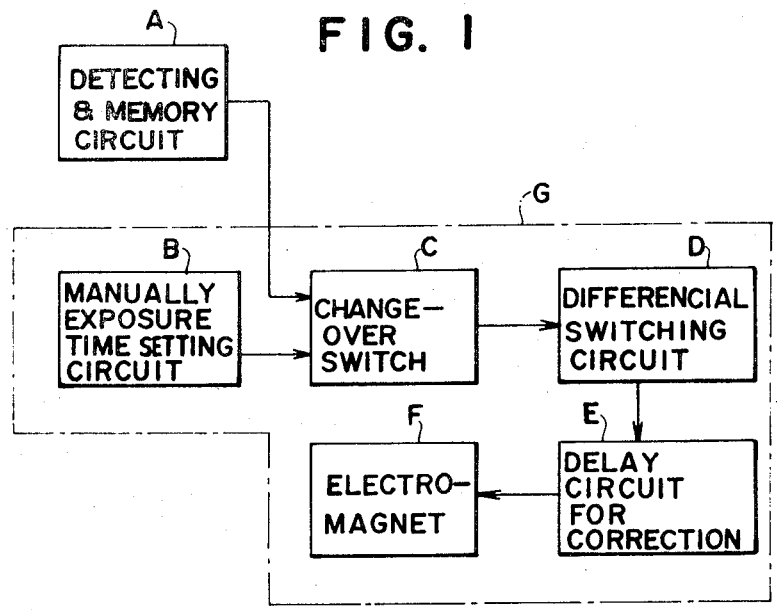
FIG. 1 is a block diagram of the present invention.
Figure 9:
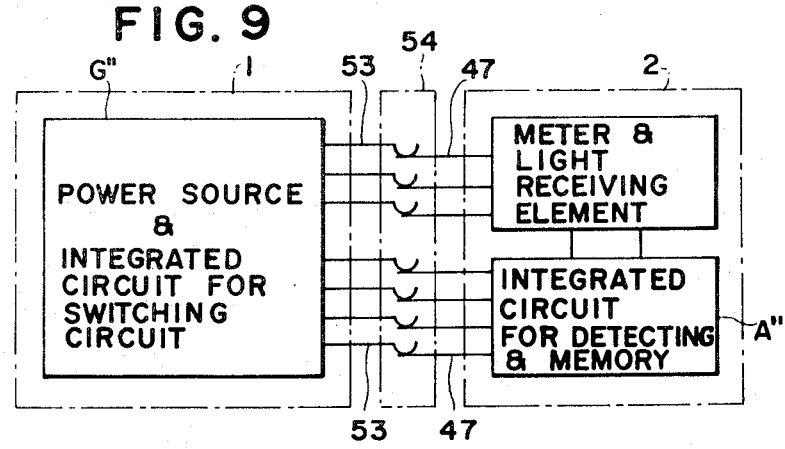
FIG. 9 is a block diagram showing the connection between the integrated circuit mounted in the camera body and the integrated circuit mounted in the finder housing.

In the block diagram shown in FIG. 1, block A is a detecting circuit for detecting the generated current from a light receptive element in pentagonal prism container 2 and a memory circuit for storing the detected output. Light receptive element 4 is mounted on roof plane 3a of pentagonal prism 3 mounted in finder housing 2 attachable to and detachable from camera body 1 of a single lens reflex camera, as shown in FIG. 3.

Figure 3:
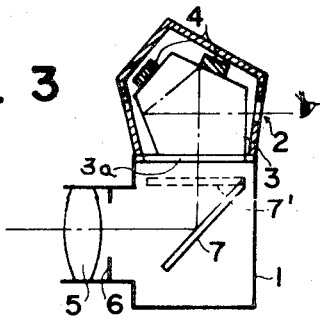
FIG. 3 is a longitudinal section of the essential portion of a camera showing an arrangement of light receiving elements in accordance with the present invention.

In FIG. 3, movable mirror 7 in the camera body is rotatably supported so as to be movable from the viewing position 7 (shown by the full line) to the picture taking position 7' (shown by the broken line), and as well known the mirror is biased so as to be normally located in the viewing position and is driven to the picture taking position in connection with the release operation.

Therefore, when the release operation is effected, light receptive element 4 is shut off from the scene light an object passing through objective lens 5 and diaphragm 6. Accordingly, block A is required to include a detecting circuit for detecting the current generated by light receptive element 4 just before movable mirror 7 is driven by the release operation from the viewing position; and a memory circuit for storing the output information of the detecting circuit as well as information relating to the aperture of diaphragm 6 and the sensitivity of the film used.

Blocks B, C, D, E, and F, encircled by chain line G in FIG. 1, are circuits built in camera body 1 in FIG. 3. Block B is an exposure time setting circuit used for photographing in which the exposure time is manually set instead of the output of block A and includes a constant time delay circuit in which a capacitor and a resistance are connected in series. By changing the resistance the time required for the charging voltage of the capacitor to reach a certain level is varied.

Block C is a change-over switch, for automatic exposure time control, to input the output of either block A or B into block D, which corresponds, respectively, to automatic exposure time control or manual exposure time control.

Block D is a differential switching circuit including a differential amplifier circuit for effecting a switching operation when the output of block A or B, via block C, reaches a predetermined level.

Block E is a delay switching circuit including a delay circuit for providing a certain minute time delay which is necessary because of the structure of the curtain shutter; and a switching circuit for switching the output transistor after a predetermined time duration.

Block F is an electromagnet the excitation of which is shut off when the output transistor in block E is switched from the conductive state to the nonconductive state, and releases the restraint of the shutter closing curtain, the operation of which is described below.

The present invention is arranged as described above, and camera body 1 is provided with a member by which the exposure time is manually set, and it is possible to use it as a camera having no automatic exposure time control function and by mounting pentagonal prism housing 2, in block A, thereon the exposure can be changed-over to automatic exposure time control. Therefore, when carrying out only manual exposure time setting photography it is understood that the camera can be used with a pentagonal prism housing not provided with the circuitry of block A.

Block A is formed as an integrated circuit in pentagonal prism housing 2, and in addition the control circuit in camera body 1 is also formed as an integrated circuit using the differential switching circuit portion of block D as a main body. In this manner, it is possible to reduce the number of terminals coming out of both integrated circuits and accordingly the circuitry can be small-sized to be incorporated very easily in the camera.

Figure 2:
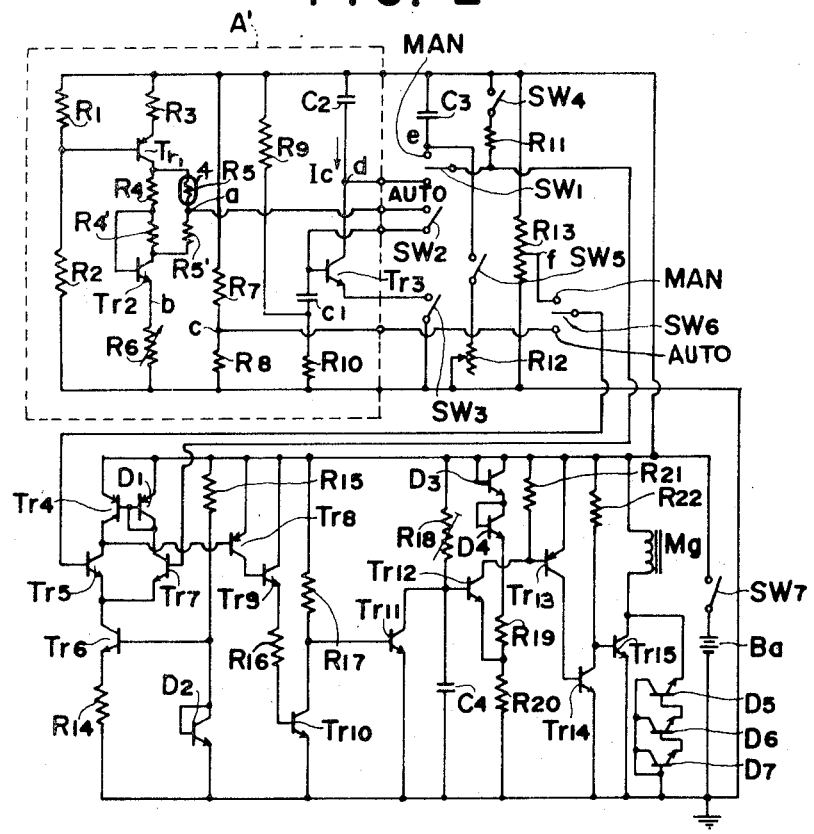
FIG. 2 is a circuit diagram of an embodiment in accordance with the present invention.

The exposure control circuit of the electric shutter composed of the blocks mentioned above will be described hereinafter, with reference to FIG. 2. The portion surrounded by broken line A' in FIG. 2 is the circuitry of block A within the pentagonal prism housing described previously. Resistances $R_1$, $R_2$, and $R_3$ and transistor $Tr_1$ form a constant current circuit. In order to keep the current from the collector of transistor $Tr_1$ constant relative to the voltage fluctuations of power source $Ba$ and variations of ambient temperature, a circuit composed of a transistor, a diode, and a resistance may be added to the aforesaid constant current circuit as is well known in the art.

The circuit connected to the collector of transistor $Tr_1$ comprises light receptive element 4 (the impedance of which is $R_5$) and resistance $R_5'$ connected in series with each other; and resistances $R_4$ and $R_4'$ connected in series with each other and shunted across the light receptive element $R_5$ and resistance $R_5'$. One terminal of shunted resistances $R_4$ and $R_4'$ is connected to the collector of transistor $Tr_2$, and at connection point $a$ between light receiving element $R_5$ and resistance $R_5'$ a potential proportional to the logarithm of the illuminance on the light receiving plane of light receptive element $R_5$ is produced relative to ground potential.

Figure 4:
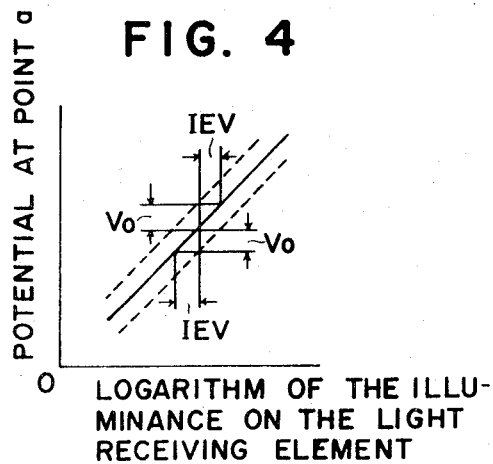
FIG. 4 is a diagram showing the relationship between the illuminance on the light receiving plane of a light receptive element vs the output of the detecting circuit for variations of the film sensitivity and the diaphragm aperture setting.

Variable resistance $R_6$, connected to the emitter of transistor $Tr_2$, provides a signal representing the aperture setting of diaphragm 6 and the film sensitivity. The base of transistor $Tr_2$ is connected to the connection point between resistances $R_4$ and $R_4'$. Light receptive impedance $R_5$ has an electrical equivalent of, for example, two photoconductive elements connected in parallel with each other and the relation between the illuminance on the light receiving plane of light receptive element 4 and the electric potential at connection point $a$ is as shown in FIG. 4. The circuit in accordance with the present invention detects the brightness of an object with the diaphragm fully opened so that a preset aperture setting of the diaphragm is required together with the film sensitivity as factors for the exposure time control. Variable resistance $R_6$ has a resistance which is linearly varied, and the film sensitivity and the preset aperture settings are added by a well known addition mechanism not shown in the drawings and represented by the resistance of variable resistance $R_6$. The level of the electric potential at connection point $a$ shifts in accordance with change in resistance of resistance $R_6$ as shown by the broken lines in FIG. 4 For a variation of 1 EV of the film sensitivity or the preset aperture, the level of shift $V_o$ is determined beforehand so as to be equal to a variation of 1EV of the illuminance on the light receiving plane of light receptive element 4. Resistances $R_7$ and $R_8$ divide the power voltage to connection point $c$ and the voltage at point $c$ is fed as an input to the differential amplifier circuit described below.

The electric potential at point $a$ charges memory capacitor $C_1$ through switch SW (described below) and is charged to a voltage proportional to the logarithm of the illuminance on the light receiving plane of light receptive element $R_5$.

The stored voltage of memory capacitor $C_1$ is impressed on the base of logarithm expansion transistor $Tr_3$, and when switch $SW_3$ is closed, the collector current flows to charge capacitor $C_2$ inserted in the collector circuit by a constant current proportional to the illuminance on the light receiving plane of light receptive element 4.

Switches $SW_1$ and $SW_6$ are change-over switches for changing over between automatic exposure time control (called hereinafter automatic exposure control) and manually set time control (called hereinafter manual exposure control). These switches are mounted on the side of camera body 1, and for automatic exposure control, change-over switches $SW_1$ and $SW_6$ are connected to "AUTO" and for manual exposure they are connected to "MAN". The circuit composed of switch $SW_1$ and resistance $R_{11}$ discharges the electric potential of capacitor $C_2$ or $C_3$.

Switches $SW_2$ and $SW_3$ are both for automatic exposure control and interlock with the release operation. Switch $SW_2$ is opened just before movable mirror 7 (shown in FIG. 3) starts to turn to picture taking position 7' to disconnect the detecting circuit from memory capacitor $C_1$. Accordingly, the light rays to light receiving element 4 are blocked and the variation of electric potential at point $a$ shown in FIG. 2 has no effect upon memory capacitor $C_1$. Switch $SW_3$ is closed simultaneously with the movement of the shutter effected by the release operation to start to charge capacitor $C_2$, and the time required for capacitor $C_2$ to reach a predetermined charging voltage is the exposure time.

The circuit in which capacitor $C_3$, switch $SW_5$ and variable resistance $R_{12}$ are connected in series with one another forms an exposure time setting circuit for manual exposure control, and switch $SW_5$ performs the same function as switch $SW_3$ for automatic exposure control. Variable resistance $R_{13}$, in parallel with the aforesaid circuit, is a variable resistance determined in accordance with the aperture setting and the film sensitivity for manual exposure control.

The circuit composed of transistors $Tr_4$, $Tr_5$, $Tr_6$, $Tr_7$, diodes $D_1$, $D_2$, and resistances $R_{14}$ and $R_{15}$ forms a differential amplifier circuit. The base of transistor $Tr_7$ receives the charging voltage of capacitor $C_2$ or $C_3$ and the other transistor $Tr_5$, in the case of automatic exposure control, receives the voltage at point $c$, where the power voltage is divided by resistances $R_7$ and $R_8$, and in the case of manual exposure control receives the voltage at point $f$ of variable resistance $R_{13}$. When the base potential of transistor $Tr_7$ drops to coincide with the base potential of transistor $Tr_5$, transistor $Tr_5$ is switched from non-conduction into conduction and the collector potential drops to energize transistor $Tr_8$. Transistor $Tr_8$ forms a switching circuit together with transistors $Tr_9$, $Tr_{10}$, $Tr_{11}$, and resistances $R_{16}$, $R_{17}$, and when transistor $Tr_8$ is switched into conduction it reverses transistor $Tr_{11}$ into non-conduction. The aforesaid switching circuit and differential amplifier circuit form a differential switching circuit.

Figure 5:
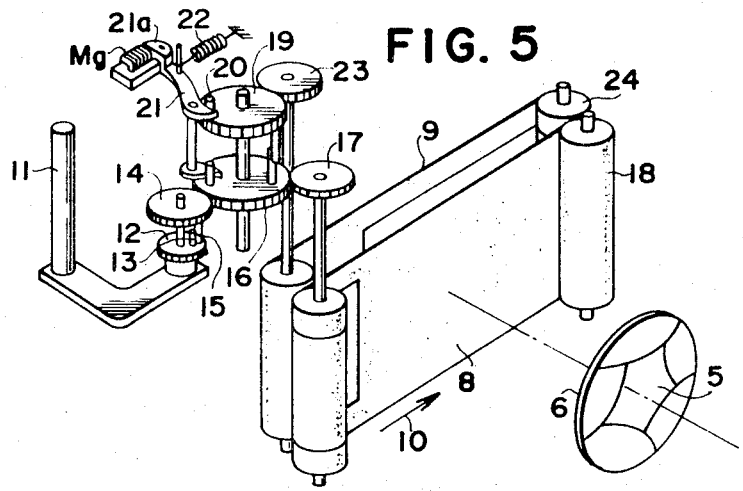
FIG. 5 is a perspective view showing one example of an arrangement of a curtain shutter wherein the exposure of the curtain shutter is controlled by the exposure control system in accordance with the present invention.

The collector and emitter of transistor $Tr_{11}$ are connected to each other across capacitor $C_4$, connected in series to variable set resistance $R_{18}$. Therefore, when transistor $Tr_{11}$ is switched into non-conduction, capacitor $C_4$ id charged with a time constant determined by the resistance value of resistance $R_{18}$ and the capacity of capacitor $C_4$. When the charging voltage reaches a predetermined voltage, transistor $Tr_{12}$ is reversed from non-conduction into conduction to energize transistors $Tr_{13}$ and $Tr_{14}$. Transistor $Tr_{15}$ becomes non-conductive because the base current thereof is cut off. Electromagnet $Mg$, in the collector of output transistor $Tr_{15}$ for retaining armature 21a of restraining lever 21 for rear curtain 9 in the curtain shutter shown in FIG. 5, is blocked from being energized, and accordingly the rear curtain starts to move to terminate the exposure.

Resistances $R_{19}$, $R_{20}$ and diodes $D_3$, $D_4$, connected to the emitter of transistor $Tr_{12}$, form a circuit for compensating the operation of transistor $Tr_{12}$ for changes in temperature and voltage fluctuations of power source. Diodes $D_5$, $D_6$, and $D_7$, connected to transistor $Tr_{15}$ across the collector and emitter thereof, absorb the counter-electromotive force induced in electromagnet $Mg$, and resistances 21 and 22 regulate the base current of transistors $Tr_{13}$ and $Tr_{15}$.

The following is a description of the operation of the automatic exposure control formed as described above. In this case, change-over switches $Sw_1$ and $Sw_6$ are connected to the AUTO side of their contacts, switches $SW_2$ and $SW_4$ are closed, and switches $SW_3$ and $SW_5$ are opened. But the opening/closing of switch $SW_5$ is unrelated to the operation in this case.

Before taking a picture the resistance of variable resistance $R_6$ is determined by the setting of the diaphragm aperture and the sensitivity of the film used; and power switch $SW_7$ is, for example, open, and when shutter button 11 of the camera is depressed, switch $SW_7$ is closed as it is interlocked with shutter button 11. Thereby, the electric circuit is energized, however, capacitor $C_2$ has been short-circuited by closed switch $SW_4$ and accordingly the base potential of transistor $Tr_5$ in the differential amplifier circuit is lower than that of transistor $Tr_7$. Therefore, transistor $Tr_5$ is non-conductive. As a result, transistors $Tr_8$, $Tr_9$, and $Tr_{10}$ are non-conductive, transistor $Tr_{11}$ is energized, and capacitor $C_4$ in the differential switching circuit is short-circuited. Output transistor $Tr_{15}$ is energized to excite electromagnetic $Mg$ and the driving of rear curtain 8 of the curtain shutter (shown in FIG. 5) is checked. That is, FIG. 5 shows the essential portion of the mechanical structure of the curtain shutter in accordance with the present invention wherein the shutter is cocked. In FIG. 5, the image forming light ray of an object passing through photographic lens 5 and diaphragm 6 is blocked by shutter front curtain 8. When front curtain 8 drives in the direction shown by arrow 10, the exposure is started, and after a predetermined time rear curtain 9 drives in the direction shown by arrow 10 and the exposure is terminated. Upon depressing shutter button 11 the restraint of the front curtain restraining member (not shown in the drawing) is released, and at the same time the engagement of pin 13 of winding gear 12 and pin 15 of gear 14 is disconnected. Thereby, the restraint of gear 16 is released, and opening gear 17, meshed with gear 16, is driven in the direction shown by arrow 10 by front curtain take-up shaft 18. Whereas, as to rear curtain 9, with electromagnetic $Mg$ excited as described above, armature 21a is attracted against spring 22 and closing restraining lever 21 engages with pin 20 of gear 19 meshed with closing gear 23 to check the rotation of gear 19. Accordingly, rear curtain 9 is checked against being driven. And, when electromagnetic $Mg$ is demagnetized by the switching operation of the differential switching circuit described above, the engagement of closing curtain restraining lever 21 and pin 20 is disconnected, and gear 19 rotates and rear curtain 9 starts to drive to shut off the exposure.

By the process of further depressing shutter button 11, switches $SW_2$ and $SW_4$ in FIG. 2 are opened and then switch $SW_3$ is closed simultaneously with starting movement of front curtain 8, and collector current $Ic_3$, proportionately expanded with respect to the voltage between the base and emitter of transistor $Tr_3$, flows to charge capacitor $C_2$. The electric potential at point $d$ on one end of capacitor $C_2$ drops and accordingly the base potential of transistor $Tr_7$ in the differential amplifier circuit drops, and when that base potential drops lower than the electric potential at point $c$ set by resistances $R_7$ and $R_8$, namely, the base potential of transistor $Tr_5$, both transistors $Tr_5$ and $Tr_7$ are reversed. Transistor $Tr_8$ becomes conductive, transistor $Tr_{11}$ becomes non-conductive, and capacitor $C_4$ starts to charge by the current flowing through variable set resistance $R_{18}$.

The time between when the front curtain starts to drive and when transistor $Tr_{11}$ is switched into non-conduction is the exposure time automatically controlled by the detecting circuit and the differential switching circuit. However, in the present invention the driving movement of the rear curtain is formed to start a specific time later than the time when transistor 11 became non-conductive. The reason will be described hereinafter.

Figure 6:
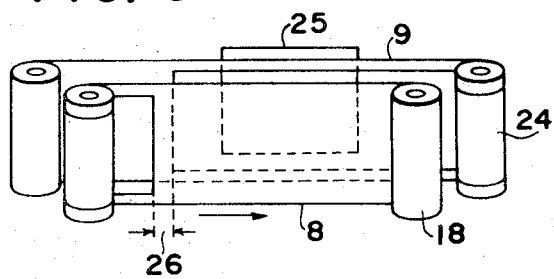
FIG. 6 is a perspective view showing the relationship between the opening curtain and the closing curtain of a curtain shutter and also showing the exposure frame of the camera.
Figure 7:
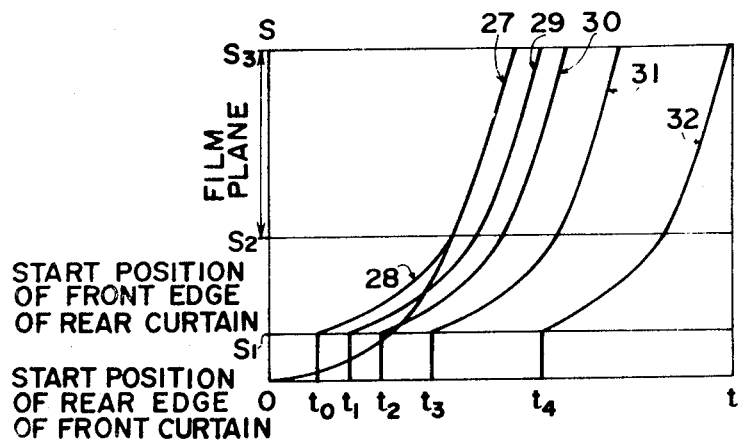
FIG. 7 is a diagram showing the movement of the opening curtain and the closing curtain as a function of time.

FIG. 6 shows the camera opening frame 25 and the relation between both front and rear curtains 8 and 9 at the time when the shutter is cocked as in FIG. 5. In such a curtain shutter having two curtains, in general in order to prevent light from leaking during winding, a predetermined overlap such as the portion shown by numeral 26 in FIG. 6 is formed between front curtain 8 and rear curtain 9. As a result, both curtains have driving movements as shown in FIG. 7. In FIG. 7, the abscissa shows the time interval $t$ from the driving start of the front curtain, and the ordinate shows the moving position S of the curtain during a certain time interval. $S_1$ indicates that rear curtain 9 starts to be driven from a position closer to the side of take-up shaft 24 than front curtain 8 by as much as the width 26 of the overlap of both curtains. $S_2$ and $S_3$ indicate both ends of a film picture plane exposed over opening frame 25 of the camera. Curve 27 indicates the displacement characteristic of front curtain 8 as a function of time and curves 28, 29, 30, 31, and 32 indicate respective movement characteristics of rear curtain 9 which is started at times $t_0$, $t_1$, $t_2$, $t_3$, or $t_4$ seconds subsequent to the driving start of front curtain 8. The fact that the slope of every curve of both curtains is small just after being started is due to the force of inertia. The transverse interval between the driving curves 27 and the other curves 28 to 32 on the film picture plane (between $S_2$ and $S_3$) are the respective exposure times.

Thus, when the movement of rear curtain 9 is started a time, $t_0$, after the driving of front curtain 8 is started, both curves 27 and 28 are fully overlapped between $S_2$ and $S_3$. THis fact indicates that even though the driving of rear curtain 9 is started a time, $t_0$, after the driving of front curtain is started, the relative cocked positions of the screens are such that the exposure time substantially effected is zero. This fact means that also between driving curve 27 and the other driving curves 29 to 32 the exposure time is shortened relative to the respective starting times, $t_1$ to $t_4$, of rear curtain 9. That is to say, in general, provided the exposure time of a film is T and the starting time interval between the curtains is $Ts$, the relationship, $Ts = T + T_0$, is established.

As described above, time $t_0$ is based on the overlap of front and rear curtains 8 and 9 and specifically by the amount of overlap thereof, which is an inherent constant for every curtain shutter. $t_0$ is in general from 4/1000 to 5/1000 seconds and from 4 to 5 times as high as the highest speed 1/1000 second of the shutter, as determined from measurements of common curtain shutters. Therefore, sufficient compensation of the exposure error due to such a time $t_0$ is very important for increasing the precision of the shutter speed.

In the present invention, a delay switching circuit to compensate for time $t_0$ is provided on the output side of the differential switching circuit. This is the circuit from variable set resistance $R_{18}$ and capacitor $C_4$ to transistor $Tr_{84\ 15}$. The impedance of variable resistance $R_{18}$ is properly set for a particular camera and a delayed operation time equivalent to $t_0$ for the switching time of transistor $Tr_{11}$ is provided, after which output transistor $Tr_{15}$ operates electromagnet M$g$.

Further, in the case of manual exposure control, by connecting change-over switches $SW_1$ and $SW_6$ to contact MAN and optionally setting the impedance of variable resistance $R_{12}$, the shutter speed setting is set. After the closing of switch $SW_7$, upon depressing the shutter button switch $SW_4$ is first opened and then switch $SW_5$ is closed. And thus, capacitor $C_3$ is charged, and when the electric potential at connection point $e$ drops lower than that of sliding terminal $f$ of variable resistance $R_{13}$ (for converting the film sensitivity and the diaphragm aperture), the conduction of transistors $Tr_5$ and $Tr_7$ in the differential amplifier circuit is reversed and transistor $Tr_5$ is made conductive. Thereafter, the same operations as in automatic exposure control are carried out.

The primary purpose of the present invention is to integrate the circuit in FIG. 2 to facilitate its incorporation in a camera. The chip of an integrated circuit itself is very small-sized, but the terminals coming out of the chip become numerous and accordingly the space therefor is increased as a matter of course. If the entire circuit shown in FIG. 2 is integrated on one base plate, the number of terminals for the integrated circuit would be 26, and incorporating such an integrated circuit would require increasing the capacity of the camera.

Therefore, in the present invention, the circuits are divided between pentagonal prism housing 2 and camera body 1, and pentagonal prism housing 2 is interchangeably attached to and detached from the camera body. In pentagonal prism container 2 there are mounted light receptive element 4; the circuit for charging with a constant current the capacitor for controlling the exposure time to a value determined by the illuminance on the light receiving surface of light receptive element 4, the aperture setting, and the sensitivity of the film used; and the memory circuit. The integrated circuit thereof is composed of transistors, diodes, and small resistances. In camera body 1 there are mounted the exposure time setting circuit for manually setting the exposure time; a change-over switch for changing over the output of the memory circuit and the exposure time setting circuit; and the switching circuit including the differential amplifier circuit to which the memory circuit or the exposure time setting circuit is connected via the change-over switch. These circuits are also integrated. By using integrated circuits and dividing the circuits as indicated above, the number of terminals is reduced to under 14 and the respective chips are small-sized so that they are respectively incorporated into pentagonal prism housing 2 and camera body 1 with ease.

Figure 8:
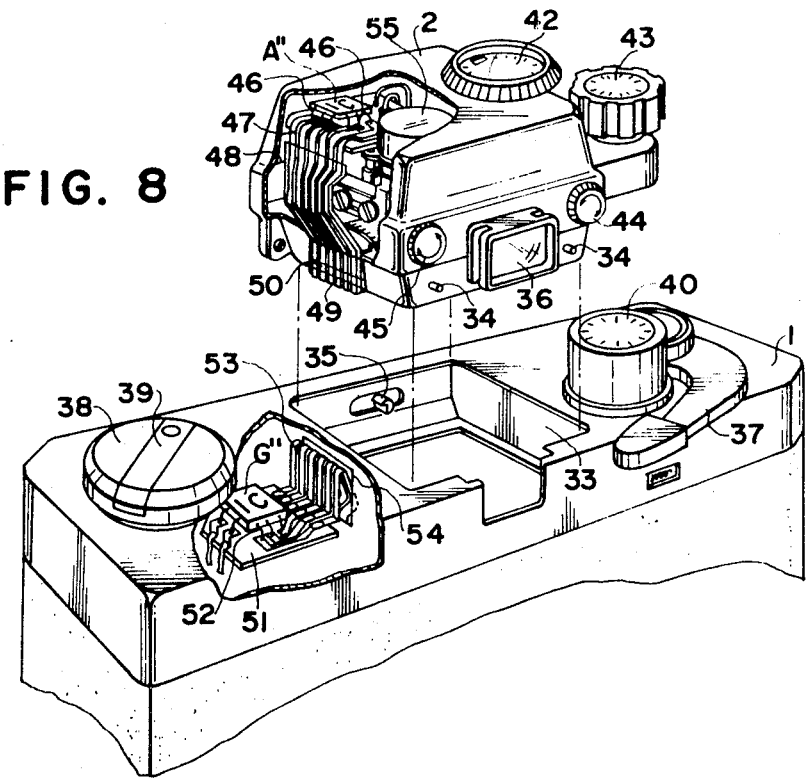
FIG. 8 is a perspective view showing the arrangement of the essential components of one embodiment in accordance with the present invention.

The arrangement of the respective circuits incorporated in camera body 1 and pentagonal prism housing 2 is shown in FIG. 8. Reference numeral 33 denotes an opening formed on the central portion of the top surface of camera body 1. In opening 33 interchangeable pentagonal prism housing 2 is fitted, and by pin 34, projecting on the opposite side of eyepiece 36 of pentagonal prism housing 2, and lock member 35, formed on the side wall of opening 33, pentagonal prism housing 2 is fixed in a definite position in opening 33. And, when movable mirror 7 is located in the viewing position, the image of the scene light passing through objective lens 5 and diaphragm 6 from an object is observed in eyepiece 36.

Numeral 37 denotes a winding lever formed on camera body 1, and 38 a film rewinding member having foldable rewinding lever 39, and the rewinding shaft extends inwardly from the center of rewinding member 38 into camera body 1. Numeral 40 denotes an exposure time setting dial, and 41 an operation member for operating change-over switches $SW_1$ and $SW_6$ described above.

On the top surface of pentagonal prism housing 2 film sensitivity setting dial 42 and exposure time setting dial 43 are formed, and on the side wall on which eyepiece 36 is formed there are also provided switch 44 for opening/closing the power source and operation member 45 for screening eyepiece 36 to shut off the light rays coming from eyepiece 36 into the pentagonal prism.

In pentagonal prism housing 2 there is formed a flexible base plate 48 with printed conductors 47 to which the terminals of integrated circuit A'' and the terminals of the other circuits which are not integratable are connected. For example, at portion 49 of base plate 48 conductor 47 forms exposed contact portion 50, and printed conductors 47 are coated with an insulating film of the same substance as the base plate. Numeral 55 denotes a meter.

On the slanting lower portion of rewinding member 38 in camera body 1, integrated circuit G''', composed of the manual exposure time setting circuit and the differential switching circuit including the differential amplifier circuit, is mounted. On base plate 51 terminals 52 of the integrated circuit and of the non-integratable circuits are connected to elastic contact pieces 53 made of metal and the ends of contact pieces 53 are inserted into opening 33 from window 54 formed on the side wall of opening 33.

Thus, when pentagonal prism housing 2 is mounted in the proper position in opening 33, elastic contact pieces 53 are electrically connected to printed conductors 47 of flexible base plate 48 respectively by connection contact 50, and the circuit shown in FIG. 2 is set up.

What is claimed is:

1. An exposure control system for a single lens reflex camera comprising:
 a camera body including reflecting means movable between a viewing position and a picture taking position;
 a housing attachable to said camera body and including:
 a light receptive element for generating a signal in accordance with the incident light thereon;
 said reflecting means reflecting light passing through the objective lens of the camera to said light receptive element and a viewfinder in said viewing position;
 means for detecting said signal and generating an output signal;
 means for storing said output signal;
 an integrated circuit comprising elements from said means for detecting and said means for storing, said integrated circuit including first terminals; and
 non-integrated circuitry including the other elements from said means for detecting and said means for storing and having second terminals;
 and at least one of said second terminals connecting with at least one of said first terminals;
 said camera body further including:
 a circuit for manually setting exposure time;
 switching means for changing between manual and automatic time-exposure settings and connected to one of said first terminals connected to said means for storing;
 switching circuit means connected to said means for switching;
 means actuated by said switching circuit means for terminating exposure;
 a second integrated circuit including elements of said circuit for manually setting exposure time and said switching circuit means, said second integrated circuit including third terminals; and
 second non-integrated circuitry including the other elements of said means for manually setting exposure time and said switching circuit means, and including fourth terminals, and at least one of said fourth terminals connecting with at least one of said third terminals.

2. An exposure control system for a single lens reflex camera as in claim 1 wherein with said housing attached to said camera body connections are established between said first and said second terminals, and said third and said fourth terminals.

3. An exposure control system for a single lens reflex camera as in claim 2 wherein:
 said means for detecting includes means for generating constant current, a first transistor, a first resistance connected in series with said light receptive element, a divided resistance connected in parallel with said light receptive element and said first resistance and interconnecting said means for generating constant current with the collector of said first transistor, the base of said first transistor is connected to the junction of said divided resistance, a variable resistance connected to the emitter of said first transistor and having a resistance varying in accordance with the sensitivity of the film and the diaphragm aperture setting, and an output terminal connected to the junction of said light receptive element and said first resistance;
 said means for storing includes a capacitor, a first normally closed switch interconnecting said capacitor with said output signal, said first switch is opened prior to the movement of said movable means from said viewing position to said picture taking position with the camera release operation; and whereby the variation in the voltage produced by said output signal from a one volt variation across said variable resistance is the same variation in the voltage produced by said output signal from a one volt variation produced by the light radiation on the light receiving plane of said light receptive element.

4. An exposure control system for a single lens reflex camera as in claim 2 wherein said camera includes opening and closing curtains cocked in overlapping relationship and wherein said camera body further includes:

a constant time delay circuit including a series connected second resistance and second capacitor, the junction between said resistance and said second capacitor is connected to the output of said switching circuit means;

a second transistor having a base connected to the junction of said resistance and said second capacitor, said means for terminating exposure is driven by said second transistor; and said second resistance is set at a value whereby the error in exposure time introduced by said overlapped opening and closing curtains is compensated.

5. An exposure control system for a single lens reflex camera as in claim 2 wherein either one of said first and second terminals, and said third and fourth terminals is a flexible contact element; and the other of said first and second terminals, and said third and fourth terminals is printed on a flexible insulating base plate.

* * * * *